United States Patent
Tamasi et al.

(10) Patent No.: US 8,417,838 B2
(45) Date of Patent: Apr. 9, 2013

(54) SYSTEM AND METHOD FOR CONFIGURABLE DIGITAL COMMUNICATION

(75) Inventors: Anthony Michael Tamasi, San Jose, CA (US); Barry A. Wagner, San Jose, CA (US); John S. Montrym, Los Altos Hills, CA (US)

(73) Assignee: Nvidia Corporation, Santa Clara, CA (US)

( * ) Notice: Subject to any disclaimer, the term of this patent is extended or adjusted under 35 U.S.C. 154(b) by 146 days.

(21) Appl. No.: 11/301,574

(22) Filed: Dec. 12, 2005

(65) Prior Publication Data

US 2007/0162624 A1 Jul. 12, 2007

(51) Int. Cl.
*G06F 3/00* (2006.01)

(52) U.S. Cl.
USPC ........ 710/8; 710/11; 710/62; 710/65; 710/72; 710/74; 710/100; 710/305; 710/315; 345/501; 345/520; 345/522; 345/530; 345/531; 345/533

(58) Field of Classification Search ...................... 710/11
See application file for complete search history.

(56) References Cited

U.S. PATENT DOCUMENTS

| | | | |
|---|---|---|---|
| 3,940,740 A | 2/1976 | Coontz | 438/130 |
| 4,541,075 A | 9/1985 | Dill et al. | 365/189.04 |
| 4,773,044 A | 9/1988 | Sfarti et al. | 711/211 |
| 4,885,703 A | 12/1989 | Deering | 345/422 |
| 4,951,220 A | 8/1990 | Ramacher et al. | 716/136 |
| 4,985,988 A | 1/1991 | Littlebury | 438/15 |
| 5,036,473 A | 7/1991 | Butts et al. | 703/23 |
| 5,125,011 A | 6/1992 | Fung | 377/73 |
| 5,276,893 A | 1/1994 | Savaria | 714/10 |
| 5,379,405 A * | 1/1995 | Ostrowski | 710/65 |
| 5,392,437 A | 2/1995 | Matter et al. | 713/324 |
| 5,448,496 A | 9/1995 | Butts et al. | 716/116 |
| 5,455,536 A | 10/1995 | Kono et al. | 329/325 |
| 5,513,144 A | 4/1996 | O'Toole | 365/200 |
| 5,513,354 A | 4/1996 | Dwork et al. | 718/106 |
| 5,578,976 A | 11/1996 | Yao | 333/262 |
| 5,630,171 A * | 5/1997 | Chejlava et al. | 710/23 |
| 5,634,107 A | 5/1997 | Yumoto et al. | 711/111 |
| 5,638,946 A | 6/1997 | Zavracky | 200/181 |

(Continued)

FOREIGN PATENT DOCUMENTS

| | | |
|---|---|---|
| TW | 093127712 | 7/2005 |
| WO | 2004030127 | 3/2005 |
| WO | 2005029329 | 3/2005 |

OTHER PUBLICATIONS

'OSI Reference Model—The ISO Model of Architecture for Open Systems Interconnection,' by Zimmermann, IEEE Transactions on Communications, Apr. 1980.*

(Continued)

*Primary Examiner* — Steven Snyder

(57) ABSTRACT

The present invention pertains to a configurable PCI-Express switch. The configurable PCI-Express switch includes a differential I/O interface capable of being configured in a first configuration or a second configuration. In the first configuration, the differential I/O interface implements a PCI-Express interface with a coupled device. In the second configuration, the differential I/O interface implements a differential interface other than PCI-Express with the coupled device. The configurable PCI-Express switch also includes a switching unit capable of configuring the differential I/O interface in the first configuration or the second configuration.

21 Claims, 6 Drawing Sheets

U.S. PATENT DOCUMENTS

| | | | |
|---|---|---|---|
| 5,671,376 A | 9/1997 | Bucher et al. | 710/305 |
| 5,694,143 A * | 12/1997 | Fielder et al. | 345/519 |
| 5,705,938 A | 1/1998 | Kean | 326/39 |
| 5,766,979 A | 6/1998 | Budnaitis | 438/15 |
| 5,768,178 A * | 6/1998 | McLaury | 365/149 |
| 5,805,833 A * | 9/1998 | Verdun | 710/303 |
| 5,884,053 A * | 3/1999 | Clouser et al. | 710/312 |
| 5,896,391 A | 4/1999 | Solheim et al. | 714/704 |
| 5,909,595 A | 6/1999 | Rosenthal et al. | 710/38 |
| 5,913,218 A | 6/1999 | Carney et al. | 1/1 |
| 5,937,173 A * | 8/1999 | Olarig et al. | 710/312 |
| 5,956,252 A | 9/1999 | Lau et al. | 700/120 |
| 5,996,996 A | 12/1999 | Brunelle | 209/573 |
| 5,999,990 A | 12/1999 | Sharrit et al. | 710/8 |
| 6,003,100 A * | 12/1999 | Lee | 710/301 |
| 6,049,870 A | 4/2000 | Greaves | 713/1 |
| 6,065,131 A | 5/2000 | Andrews et al. | 713/600 |
| 6,067,262 A | 5/2000 | Irrinki et al. | 365/201 |
| 6,069,540 A | 5/2000 | Berenz et al. | 333/101 |
| 6,072,686 A | 6/2000 | Yarbrough | 361/234 |
| 6,085,269 A | 7/2000 | Chan et al. | 710/100 |
| 6,094,116 A | 7/2000 | Tai et al. | 335/78 |
| 6,219,628 B1 | 4/2001 | Kodosky et al. | 703/2 |
| 6,249,288 B1 | 6/2001 | Campbell | 345/629 |
| 6,255,849 B1 | 7/2001 | Mohan | 326/41 |
| 6,307,169 B1 | 10/2001 | Sun et al. | 200/181 |
| 6,323,699 B1 | 11/2001 | Quiet | 327/108 |
| 6,348,811 B1 | 2/2002 | Haycock et al. | 326/16 |
| 6,363,285 B1 | 3/2002 | Wey | 607/100 |
| 6,363,295 B1 | 3/2002 | Akram et al. | 700/121 |
| 6,370,603 B1 * | 4/2002 | Silverman et al. | 710/72 |
| 6,377,898 B1 | 4/2002 | Steffan et al. | 702/82 |
| 6,388,590 B1 * | 5/2002 | Ng | 341/100 |
| 6,389,585 B1 | 5/2002 | Masleid et al. | 716/112 |
| 6,392,431 B1 | 5/2002 | Jones | 324/750.09 |
| 6,429,288 B1 | 8/2002 | Esswein et al. | 530/331 |
| 6,429,747 B2 * | 8/2002 | Franck et al. | 330/301 |
| 6,433,657 B1 | 8/2002 | Chen | 333/262 |
| 6,437,657 B1 * | 8/2002 | Jones | 333/25 |
| 6,486,425 B2 | 11/2002 | Seki | 200/181 |
| 6,504,841 B1 | 1/2003 | Larson et al. | 370/386 |
| 6,530,045 B1 | 3/2003 | Cooper et al. | 714/719 |
| 6,535,986 B1 | 3/2003 | Rosno et al. | 713/400 |
| 6,598,194 B1 | 7/2003 | Madge et al. | 714/745 |
| 6,629,181 B1 | 9/2003 | Alappat et al. | 710/300 |
| 6,662,133 B2 | 12/2003 | Engel et al. | 702/117 |
| 6,700,581 B2 | 3/2004 | Baldwin et al. | 345/519 |
| 6,701,466 B1 | 3/2004 | Fiedler | 714/699 |
| 6,717,474 B2 * | 4/2004 | Chen et al. | 330/301 |
| 6,718,496 B1 | 4/2004 | Fukuhisa et al. | 714/733 |
| 6,734,770 B2 | 5/2004 | Aigner et al. | 335/78 |
| 6,738,856 B1 * | 5/2004 | Milley et al. | 710/315 |
| 6,741,258 B1 | 5/2004 | Peck, Jr. et al. | 345/568 |
| 6,747,483 B2 | 6/2004 | To et al. | 326/86 |
| 6,782,587 B2 | 8/2004 | Reilly | 24/198 |
| 6,788,101 B1 | 9/2004 | Rahman | 326/30 |
| 6,794,101 B2 | 9/2004 | Liu et al. | 430/48 |
| 6,806,788 B1 | 10/2004 | Marumoto | 333/101 |
| 6,823,283 B2 | 11/2004 | Steger et al. | 702/127 |
| 6,825,847 B1 | 11/2004 | Molnar et al. | 345/555 |
| 6,849,924 B2 | 2/2005 | Allison et al. | 257/635 |
| 6,850,133 B2 | 2/2005 | Ma | 335/78 |
| 6,879,207 B1 | 4/2005 | Nickolls | 327/526 |
| 6,938,176 B1 | 8/2005 | Alben et al. | 713/323 |
| 6,956,579 B1 | 10/2005 | Diard et al. | 345/537 |
| 6,982,718 B2 | 1/2006 | Kilgard et al. | 345/506 |
| 7,020,598 B1 | 3/2006 | Jacobson | 703/14 |
| 7,058,738 B2 * | 6/2006 | Stufflebeam, Jr. | 710/104 |
| 7,069,369 B2 * | 6/2006 | Chou et al. | 710/301 |
| 7,069,458 B1 | 6/2006 | Sardi et al. | 713/401 |
| 7,075,542 B1 | 7/2006 | Leather | 345/506 |
| 7,075,797 B1 | 7/2006 | Leonard et al. | 361/803 |
| 7,085,824 B2 | 8/2006 | Forth et al. | 709/221 |
| 7,136,953 B1 | 11/2006 | Bisson et al. | 710/307 |
| 7,170,315 B2 * | 1/2007 | Bakker et al. | 326/38 |
| 7,174,407 B2 | 2/2007 | Hou et al. | 710/301 |
| 7,174,411 B1 | 2/2007 | Ngai | 710/316 |
| 7,185,135 B1 * | 2/2007 | Briggs et al. | 710/315 |
| 7,187,383 B2 | 3/2007 | Kent | 345/505 |
| 7,246,274 B2 | 7/2007 | Kizer et al. | 714/704 |
| 7,260,007 B2 | 8/2007 | Jain et al. | 365/212 |
| RE39,898 E | 10/2007 | Nally et al. | 345/546 |
| 7,293,127 B2 | 11/2007 | Caruk | 710/305 |
| 7,305,571 B2 | 12/2007 | Cranford, Jr. et al. | 713/300 |
| 7,324,458 B2 | 1/2008 | Schoenborn et al. | 370/249 |
| 7,340,541 B2 | 3/2008 | Castro et al. | 710/31 |
| 7,398,336 B2 * | 7/2008 | Feng et al. | 710/36 |
| 7,415,551 B2 * | 8/2008 | Pescatore | 710/62 |
| 7,424,564 B2 | 9/2008 | Mehta et al. | 710/301 |
| 7,480,808 B2 | 1/2009 | Caruk et al. | 713/300 |
| 7,525,986 B2 | 4/2009 | Lee et al. | 370/462 |
| 7,594,061 B2 | 9/2009 | Shen et al. | 710/317 |
| 7,663,633 B1 | 2/2010 | Diamond et al. | 345/503 |
| 7,782,325 B2 | 8/2010 | Gonzalez et al. | 345/505 |
| 7,793,029 B1 | 9/2010 | Parson et al. | 710/306 |
| 8,132,015 B1 * | 3/2012 | Wyatt | 713/176 |
| 2002/0005729 A1 | 1/2002 | Leedy | 324/750.05 |
| 2002/0026623 A1 | 2/2002 | Morooka | 257/48 |
| 2002/0031025 A1 | 3/2002 | Shimano et al. | 365/201 |
| 2002/0158869 A1 | 10/2002 | Ohba et al. | 345/423 |
| 2003/0020173 A1 | 1/2003 | Huff et al. | 257/774 |
| 2003/0046472 A1 * | 3/2003 | Morrow | 710/305 |
| 2003/0051091 A1 | 3/2003 | Leung et al. | 711/101 |
| 2003/0061409 A1 | 3/2003 | RuDusky | 710/8 |
| 2003/0093506 A1 | 5/2003 | Oliver et al. | 709/221 |
| 2003/0115500 A1 | 6/2003 | Akrout et al. | 714/10 |
| 2003/0164830 A1 | 9/2003 | Kent | 345/505 |
| 2004/0012082 A1 * | 1/2004 | Dewey et al. | 257/686 |
| 2004/0012597 A1 | 1/2004 | Zatz et al. | 345/501 |
| 2004/0064628 A1 | 4/2004 | Chiu | 710/315 |
| 2004/0085313 A1 | 5/2004 | Moreton et al. | 345/423 |
| 2004/0102187 A1 | 5/2004 | Moller et al. | 455/418 |
| 2004/0183148 A1 | 9/2004 | Blasko, III | 257/415 |
| 2004/0188781 A1 | 9/2004 | Bar | 257/415 |
| 2004/0227599 A1 | 11/2004 | Shen et al. | 335/78 |
| 2005/0041031 A1 | 2/2005 | Diard | 345/505 |
| 2005/0044284 A1 * | 2/2005 | Pescatore | 710/15 |
| 2005/0045722 A1 * | 3/2005 | Park | 235/441 |
| 2005/0060601 A1 | 3/2005 | Gomm | 714/5.1 |
| 2005/0088445 A1 | 4/2005 | Gonzalez et al. | 345/502 |
| 2005/0173233 A1 | 8/2005 | Kaelberer | 200/181 |
| 2005/0182881 A1 | 8/2005 | Chou et al. | 710/301 |
| 2005/0237083 A1 * | 10/2005 | Bakker et al. | 326/47 |
| 2005/0246460 A1 * | 11/2005 | Stufflebeam, Jr. | 710/104 |
| 2005/0251358 A1 | 11/2005 | Van Dyke et al. | 702/117 |
| 2005/0251761 A1 | 11/2005 | Diamond et al. | 327/38 |
| 2005/0261863 A1 | 11/2005 | Van Dyke et al. | 702/123 |
| 2005/0278666 A1 | 12/2005 | Diamond | 700/110 |
| 2005/0285863 A1 | 12/2005 | Diamond | 345/519 |
| 2006/0004536 A1 | 1/2006 | Diamond et al. | 702/123 |
| 2006/0055641 A1 | 3/2006 | Robertus et al. | 345/82 |
| 2006/0106911 A1 | 5/2006 | Chapple et al. | 709/200 |
| 2006/0123177 A1 | 6/2006 | Chan et al. | 710/306 |
| 2006/0190663 A1 * | 8/2006 | Lu | 710/312 |
| 2006/0221086 A1 | 10/2006 | Diard | 345/505 |
| 2006/0252285 A1 | 11/2006 | Shen | 439/43 |
| 2006/0267981 A1 | 11/2006 | Naoi | 345/426 |
| 2006/0267987 A1 | 11/2006 | Litchmanov | 345/502 |
| 2006/0282604 A1 * | 12/2006 | Temkine et al. | 710/314 |
| 2007/0038794 A1 | 2/2007 | Purcell et al. | 710/306 |
| 2007/0067535 A1 | 3/2007 | Liu | 710/300 |
| 2007/0088877 A1 | 4/2007 | Chen et al. | 710/71 |
| 2007/0115271 A1 | 5/2007 | Seo et al. | 345/204 |
| 2007/0115290 A1 * | 5/2007 | Polzin et al. | 345/501 |
| 2007/0115291 A1 | 5/2007 | Chen et al. | 345/506 |

OTHER PUBLICATIONS

'SuperPaint: An Early Frame Buffer Graphics System' by Richard Shoup, IEEE Annals of the History of Computing, copyright 2001.*
'Multimedia Processors' by Kuroda et al., Proceedings of the IEEE, Jun. 1998.*
'Test Requirements for Embedded Core-based Systems and IEEE P1500' by Yervant Zorian, International Test Conference, copyright IEEE 1997.*
'Addressing the System-on-a-Chip Interconnect Woes Through Communication-Based Design' by Sgroi et al., DAC 2001, Jun. 18-22, 2001, copyright ACM.*

Welch, D. "Building Self-Reconfiguring Distributed Systems Using Compensating Reconfiguration", Proceedings Fourth International Journal Conference on Configurable Distributed Systems, May 4-6, 1998, pp. 18-25.

International Search Report. PCT/US2004/030127. Mail Date Jun. 30, 2005.

European Patent Office E-Space Family List for: WO200529329 (PCT/US 2004/030127).

PCT International Preliminary Report on Patentability. PCT/US2004/030127. International Filing Date Sep. 13, 2004. Application: Nvidia Corporation. Date of Issuance of this Report: Mar. 16, 2006.

PCI Express Card Electromechanical Specification Rev. 1.1, 2005, p. 87.

* cited by examiner

SYSTEM AND METHOD FOR CONFIGURABLE DIGITAL COMMUNICATION

FIELD OF THE INVENTION

The field of the present invention pertains to electronic integrated circuits, and more particularly to configurable PCI-Express switches.

BACKGROUND OF THE INVENTION

Until recently, computer systems have primarily utilized single-ended buses and interfaces. Single-ended signaling involves varying voltage with respect to a reference voltage, which is sometimes referred to as "ground," to signal a logical "1" or "0." When running multiple signals with respect to the same ground, single-ended signaling provides a cost-effective solution as it only requires one wire per signal.

Despite being less expensive to integrate, there are downsides to single-ended signaling that limit its performance potential. For example, multiple signals sharing the same ground path can lead to crosstalk. Also, differences between ground path and signal path length, coupled with the higher current in the ground path due to signal return-current sharing, can lead to ground potential variations throughout the system. These variations in the reference potential then translate into signaling errors given that the signal potential does not similarly vary with the ground potential. And given that the signal and ground paths do not run in the same proximity to one another, noise injected on the signal path is not similarly injected on the ground path, making single-ended signaling more susceptible to noise. Consequently, in order to maintain a sufficient signal-to-noise ratio, the signal voltages must remain relatively high. High signal voltages require higher transmission power, ultimately limiting transmission distance. And even more importantly, the higher rise and fall times of the higher signal voltages limit interface speed and bandwidth. Given these disadvantages, the computer industry is slowly moving toward differential signaling.

Differential signaling involves the use of two equal-length wires or traces, where each wire carries a mirror of the signal on the other wire. Subtraction of these signals is used to signal a logical "1" or "0." Since each pair of wires or traces uses its own return path, crosstalk among signals is minimized. Also, equal-length signal paths minimize relative potential differences, providing more consistent readings as path length is varied. Finally, the two wires or traces can be run close to one another, thereby allowing common-mode noise to be cancelled when the signals are subtracted. Given that differential signaling is less susceptible to noise, lower voltages can be used to save transmitting power and allow the use of longer paths or traces. Also, the lower voltages allow higher interface speed and bandwidth given the smaller rise and fall times of the signal.

Having acknowledged the advantages of differential signaling, the computer industry is beginning to shift from single-ended interfaces to differential interfaces. For example, while the latest single-ended PCI interface (e.g., PCI-X 533) offers a theoretical bandwidth of 4.3 GB/s, the sustained bandwidth has shown to be much more modest. Moreover, the speed (e.g., 533 MHz for PCI-X 533) and additional hardware (e.g., almost twice as many pins used in the 64-bit PCI-X interfaces compared to the 32-bit PCI interfaces) used in the PCI-X interface makes it very costly to implement. As such, although PCI and PCI-X were adequate for some time, the need for increased performance at a lower cost has spurred the transition to the latest, full-duplex PCI-Express interface that enables bandwidths up to 8 GB/s in a ×16 configuration. And in the future, higher speeds and wider configurations will offer even more bandwidth to accommodate expected computing needs.

However, the transition to differential signaling will not occur immediately, thereby requiring video card manufacturers to implement backward compatibility with single-ended peripherals. For example, manufacturers of video cards generally agree that differential frame buffer memory offers significant performance improvements over single-ended frame buffer memory, but realize that a market still exists for products with single-ended frame buffer memory since the transition to differential I/O is in its early stages. Thus, manufacturers desiring to capture both markets are forced to make separate video cards, with one line incorporating single-ended frame buffer memory and another line incorporating differential frame buffer memory. Additionally, if the manufacturer wants to offer products with different amounts of frame buffer memory to satisfy varying performance needs, the manufacturer must make additional products in each line. As such, it becomes extremely costly for a manufacturer to research, design, manufacture, and market a multitude of products to satisfy the demands of each market.

Thus, a need exists for a differential interface for frame buffer memory that does not significantly increase the cost or complexity of the products comprising or utilizing the interface. Also, a need exists for a way to vary the amount of either differential or single-ended frame buffer memory, without requiring a separate product for each amount or type of frame buffer memory. Moreover, the solution to this need should not significantly increase the cost or complexity of the product. The present invention provides novel solutions to these requirements.

SUMMARY OF THE INVENTION

Embodiments of the present invention provide a system and method for digital communication with either differential or single-ended frame buffer memory, where the amount of frame buffer memory can be varied. And in contrast to prior art solutions, embodiments of the present invention provide these benefits without significantly increasing the cost or complexity of the interface.

In one embodiment, the present invention is implemented as a configurable PCI-Express switch. The configurable PCI-Express switch has both a differential I/O interface capable of being configured in a first or second configuration, and a switching unit for configuring the differential I/O interface in the first or second configuration. In the first configuration, the differential I/O interface implements a PCI-Express interface with a coupled device. In the second configuration, the differential I/O interface implements a differential interface other than PCI-Express with a coupled device. As such, the same interface may be reconfigured to communicate with a coupled device set up for PCI-Express or any other form of digital signaling (e.g., SATA, USB 2.0, or other differential signaling protocols).

In another embodiment of the present invention, the coupled device may be a detachable frame buffer memory. As such, an existing PCI-Express interface may be reconfigured to provide a differential interface for communication with frame buffer memory, thereby obviating the need for an additional interface. Thus, embodiments of the present invention represent significant cost savings without increasing the complexity of the products comprising and utilizing the interface.

In another embodiment of the present invention, an expansion interface device comprises a differential I/O interface, a plurality of memory devices, and a bus for coupling the differential I/O interface to the plurality of memory devices. The plurality of memory devices can be differential frame buffer memory. Alternatively, the plurality of memory devices can be single-ended frame buffer memory coupled to the differential I/O interface via a controller for converting the differential signal to a single-ended signal. Thus, embodiments of the present invention obviate the need to research, design, manufacture, and market a multitude of video cards with different amounts and types of frame buffer memory. As a result, the manufacturer can vary the amount of differential or single-ended frame buffer memory utilized by a single product, thereby saving the cost of producing many products without significantly increasing the complexity of the product.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
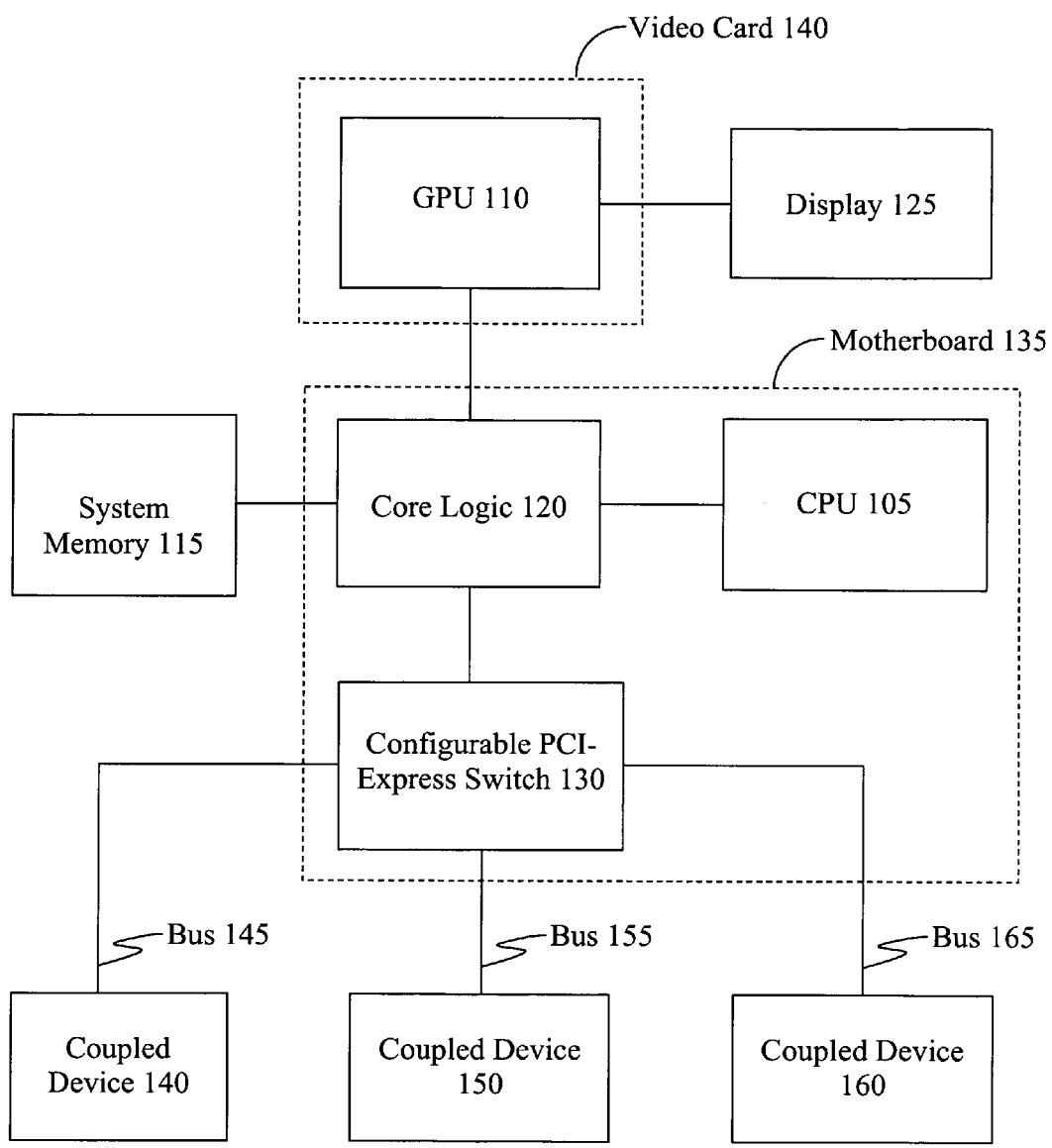
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a system and method for digital communication with either differential or single-ended frame buffer memory, where the amount of frame buffer memory can be varied. And in contrast to prior art solutions, embodiments of the present invention provide these benefits without significantly increasing the cost or complexity of the interface. Embodiments of the present invention and their benefits are further described below.

Notation and Nomenclature:

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here and generally conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions of the present invention, it is appreciated that the use of terms such as "processing" or "accessing" or "executing" or "storing" or "rendering" or "implementing" or "selecting" or "configuring" or the like, refer to the actions and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission, or display devices.

Computer System Platform:

FIG. 1 shows computer system 100 in accordance with one embodiment of the present invention. Computer system 100 depicts components of a basic computer system in accordance with one embodiment of the present invention that provides the execution platform for implementing certain hardware-based and software-based functionality of the present invention. As described above, certain processes and steps of the present invention are realized, in one embodiment, as a series of instructions (e.g., a software program) that reside within computer readable memory units of a computer system (e.g., computer system 100) and are executed by the central processing unit (CPU) of computer system 100. When executed, the instructions cause computer system 100 to implement the functionality of the present invention as described below.

In general, computer system 100 comprises at least one CPU 105 coupled to graphics processing unit (GPU) 110 and system memory 115 via one or more buses leading to core logic 120 as shown in FIG. 1. GPU 110 is coupled to display 125, which may be a CRT, LCD, or the like. Configurable PCI-Express switch 130 is also coupled to core logic 120. Coupled device 140, coupled device 150, and coupled device 160 are coupled to configurable PCI-Express switch 130 via bus 145, bus 155, and bus 165, respectively.

As shown in FIG. 1, in one embodiment, computer system 100 may be implemented as a desktop computer system or server computer system having a powerful general-purpose CPU 105 located on motherboard 135, which is coupled to a dedicated graphics rendering GPU 110 located on video card 140. In this embodiment, CPU 105, system memory 115, and core logic 120, and configurable PCI-Express switch 130 are removably coupled to motherboard 135. Also, GPU 110 is removably coupled to video card 140, where video card 140 is removably coupled to motherboard 135. However, in other embodiments, these elements may be more rigidly affixed to motherboard 135 and video card 140 by soldering or the like. In the embodiments where computer system 100 is a desktop computer system or a server computer system, components would be included that are designed to add peripheral buses, specialized graphics memory and system memory, I/O devices, and the like.

In other embodiments, computer system 100 may be configured such that CPU 105, GPU 110, system memory 115, core logic 120, and configurable PCI-Express switch are all removably coupled to the same device or circuit card. In other embodiments, these elements may be more rigidly affixed to the device or circuit card by soldering or the like. And in other embodiments, the elements of computer system 100 shown in FIG. 1 may be arranged or grouped in many other configurations. As such, it should be appreciated that although GPU 110 is depicted in FIG. 1 as implemented on video card 140, GPU 110 may be implemented, for example, as a discrete component, as a discrete integrated circuit die (e.g., mounted directly on the motherboard), or as an integrated GPU included within the integrated circuit die of a computer system chipset component (e.g., integrated within a Northbridge chip). It should also be noted that although core logic 120 is depicted as implemented on motherboard 135, it may also be implemented, for example, as a discrete component or integrated within a different component (e.g., within CPU 105, GPU 110, etc.) of computer system 100. Additionally, although configurable PCI-Express switch 130 is depicted as implemented on motherboard 135, it may also be implemented, for example, as a discrete component or integrated within a different component (e.g. within core logic 120, CPU 105, GPU 110, etc.). Similarly, computer system 100 can be implemented as a set-top video game console device such as, for example, the Xbox® available from Microsoft Corporation of Redmond, Wash., or the Playstation 3® available from Sony Computer Entertainment Corporation of Tokyo, Japan.

Embodiments of the Invention

Figure 2:
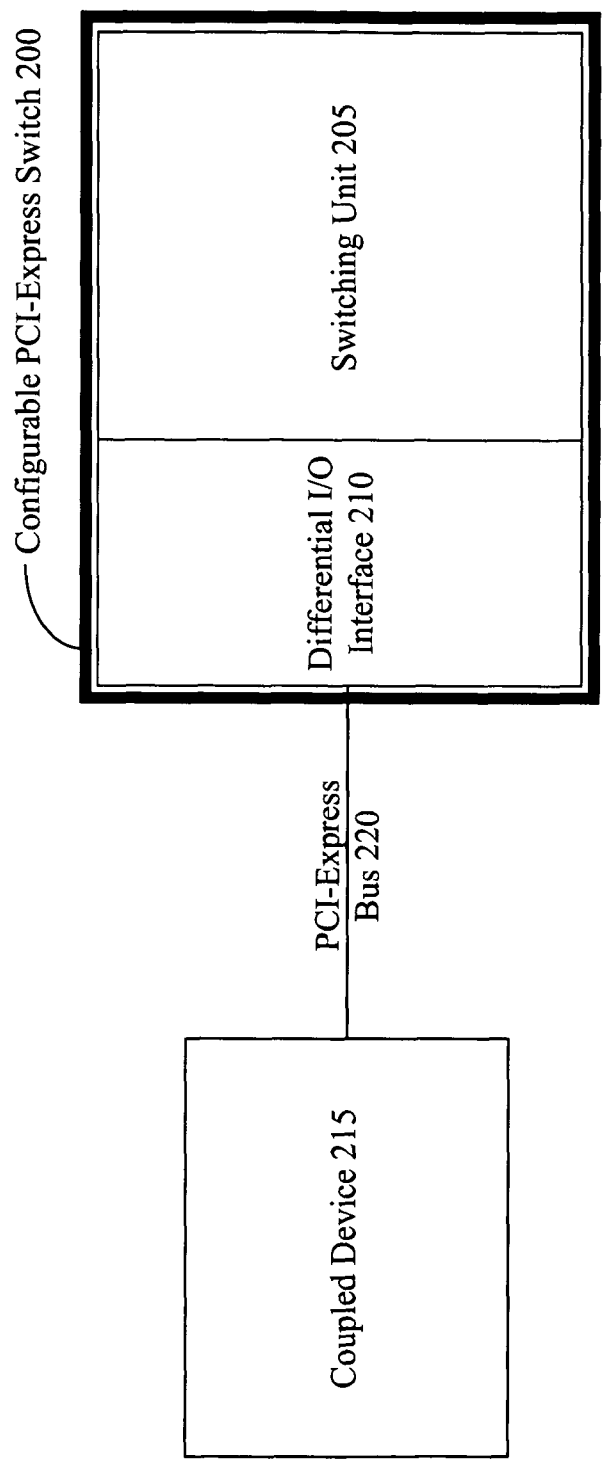
FIG. 2 shows a configurable PCI-Express switch in a first configuration in accordance with one embodiment of the present invention.

FIG. 2 shows configurable PCI-Express switch 200 in a first configuration in accordance with one embodiment of the present invention. Configurable PCI-Express switch 200 is comprised of switching unit 205 and differential I/O interface 210.

Switching unit 205 comprises hardware and software for configuring coupled interfaces. In one embodiment, switching unit 205 comprises a physical layer consisting of hardware and logical components for sending data, receiving data, and performing other functions requested by the data link layer. In another embodiment, switching unit 205 comprises a data link layer for encoding and decoding data, and performing flow control initialization, flow control updates, cyclic redundancy checks, transaction sequencing, or the like. And in another embodiment, switching unit 205 comprises a transaction layer for transferring data through the interfaces. In another embodiment, switching unit 205 comprises an application layer for configuration, control, and communication with the interface. And in another embodiment, switching unit 205 comprises a switch logic for activating, deactivating, and sending and receiving data through the different interfaces coupled to switching unit 205. Additionally, the switch logic is able to further configure and switch between or among any of these interfaces coupled by one or more buses within switching unit 205. Although FIG. 2 depicts switching unit 205 as a single component, it should be understood that switching unit 205 may be implemented, for example, as one or more discrete components, as one or more discrete components on separate dies, or as one or more discrete components on the same die.

As shown in FIG. 2, differential I/O interface 210 is the interface between switching unit 205 and coupled device 215. As discussed above, although FIG. 2 only shows one interface, namely differential I/O interface 210, it should be understood that configurable PCI-Express switch 200 comprises one or more interfaces. In one embodiment of the present invention, differential I/O interface 210 comprises hardware coupling a device to configurable PCI-Express switch 200. In another embodiment, differential I/O interface 210 comprises the physical layer of the interface. And in another embodiment, differential I/O interface 210 comprises the data link layer of the interface. In another embodiment, differential I/O interface 210 comprises the transaction layer of the interface. And in another embodiment, differential I/O interface 210 comprises the application layer of the interface. In another embodiment, differential I/O interface 210 comprises the switch logic of configurable PCI-Express switch 200. Although FIG. 2 depicts differential I/O interface 210 as a single component, it should be understood that differential I/O interface 210 may be implemented, for example, as one or more discrete components, as one or more discrete components on separate dies, or as one or more discrete components on the same die.

In the first configuration shown in FIG. 2, differential I/O interface 210 forms a PCI-Express interface for communication with coupled device 215 over PCI-Express bus 220. In one embodiment, coupled device 215 could be any device configured for communication over a PCI-Express interface. As such, coupled device 215 could communicate with the core logic components through configurable PCI-Express switch 200, thereby coupling device 215 to other components of the computer system, such as the CPU, GPU, system memory, or the like. In another embodiment, coupled device 215 could be a differential frame buffer memory configured to communicate with the GPU via a PCI-Express interface. In this embodiment, the PCI-Express interface transfers image data to the GPU such that the image data may be rendered and displayed. Additionally, PCI-Express bus 220 may comprise any number of lanes depending upon the bandwidth required for the given configuration, thereby providing flexibility and expandability for future demands.

Figure 3:
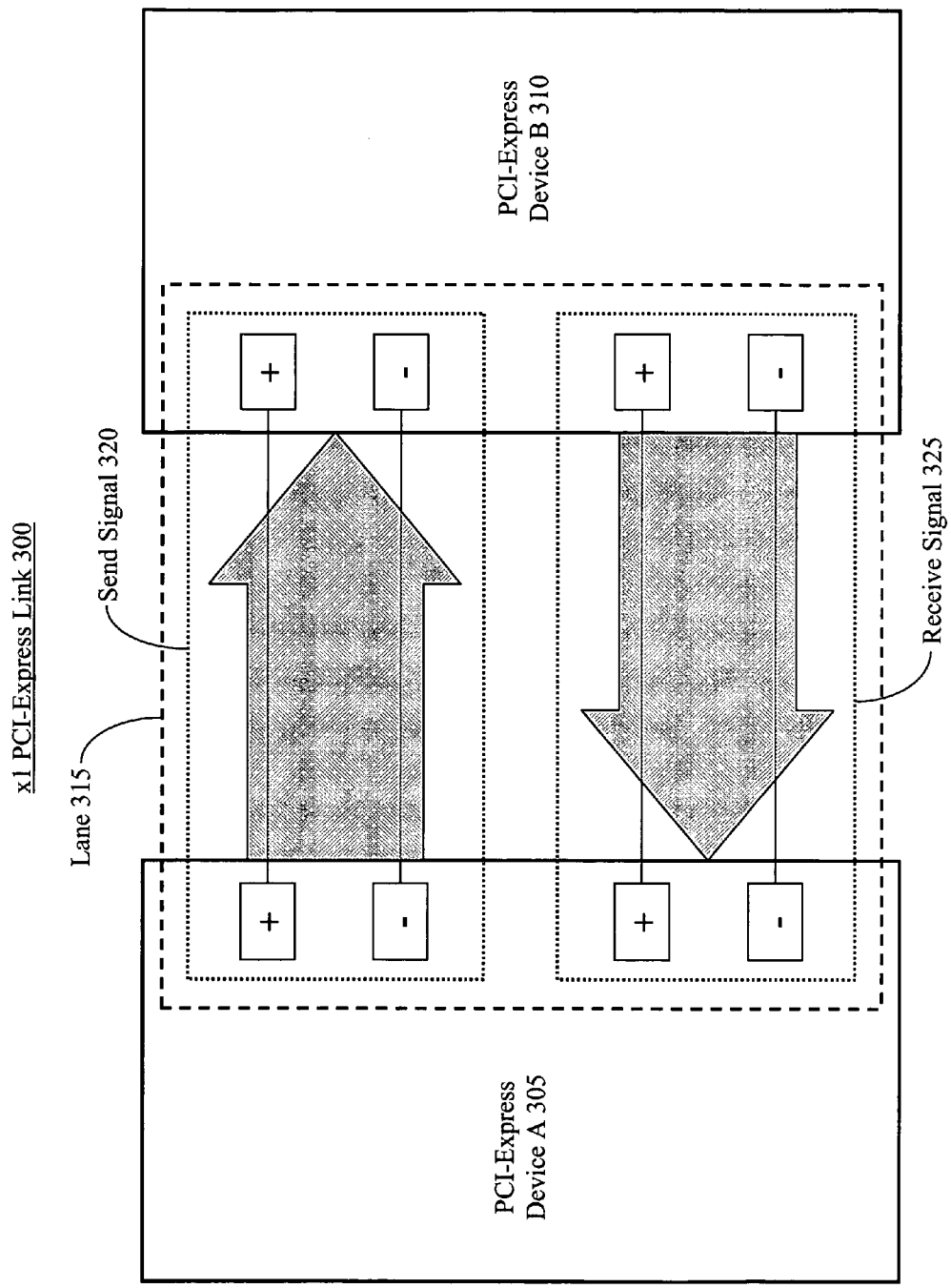
FIG. 3 shows a single-lane (×1) PCI-Express link connected between a first PCI-Express device and a second PCI-Express device in accordance with embodiments of the present invention.

FIG. 3 shows a single-lane (×1) PCI-Express link 300 connected between PCI-Express device A 305 and PCI-Express device B 310 in accordance with embodiments of the present invention. ×1 PCI-Express link 300 has one lane 315, which comprises send signal 320 and receive signal 325. Send signal 320 represents the data flow from PCI-Express device A 305 and PCI-Express device B 310. Receive signal 325, on the other hand, represents the data flow from PCI-Express device B 310 to PCI-Express device A 305. In other embodiments, the PCI-Express links may contain any number of lanes up to, for example, 32 or 64. For example, a ×8 PCI-Express link would have eight lanes, and a ×16 PCI-Express link would have 16 lanes. In such embodiments, the data packets get portioned out among the available PCI-Express lanes to enhance data transfer and fully utilize the available bandwidth.

Both send signal 320 and receive signal 325 shown in FIG. 3 utilize differential signaling. As such, data can be transferred much faster over PCI-Express interfaces than previous interfaces utilizing single-ended signaling. By utilizing these interfaces to implement differential interfaces other than PCI-Express, embodiments of the present invention provide for fast, high-bandwidth communication with devices configured for differential signaling.

Figure 4:
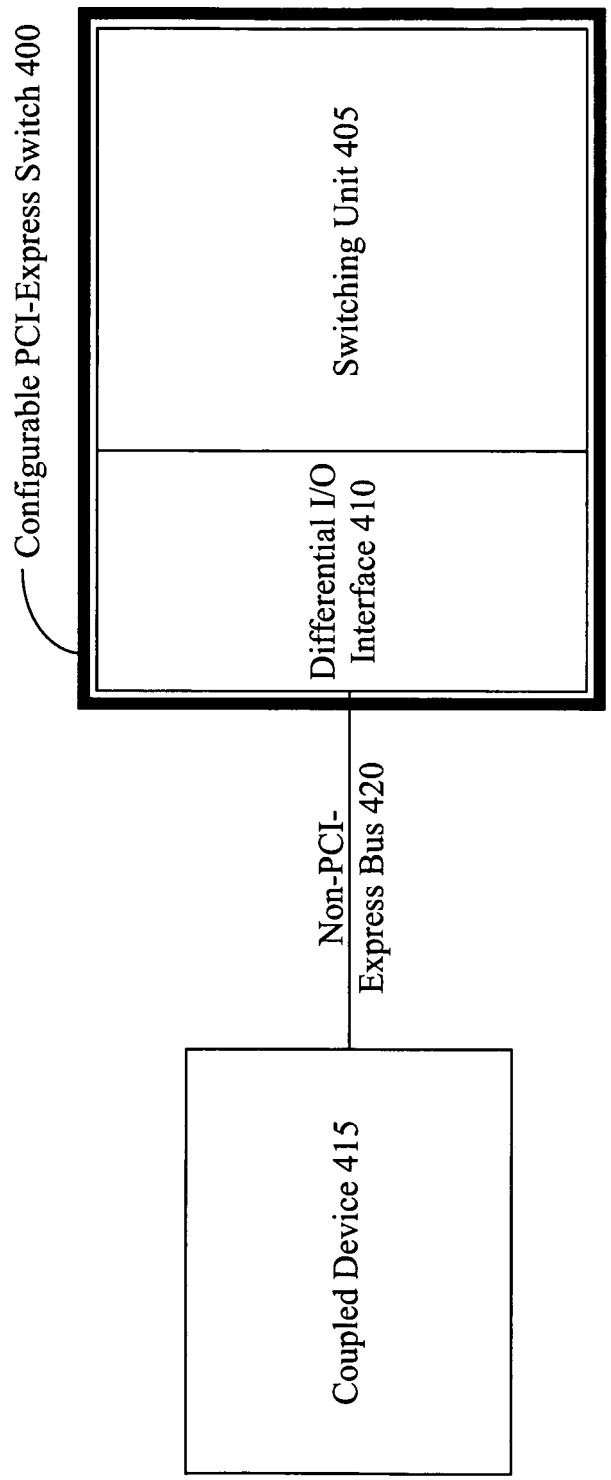
FIG. 4 shows a configurable PCI-Express switch in a second configuration in accordance with another embodiment of the present invention.

FIG. 4 shows configurable PCI-Express switch 400 in a second configuration in accordance with one embodiment of the present invention. Configurable PCI-Express switch 400 comprises switching unit 405 and differential I/O interface 410.

Switching unit 405, similar to switching unit 205 of FIG. 2, comprises hardware and software for configuring coupled interfaces. In different embodiments of the present invention, switching unit 405 may comprise a physical layer, a data link layer, a transaction layer, an application layer, or switch logic. Like switching unit 205 of FIG. 2, switching unit 405 may be implemented, for example, as one or more discrete components, as one or more discrete components on separate dies, or as one or more discrete components on the same die.

Similar to differential I/O interface 210 of FIG. 2, differential I/O interface 410 of FIG. 4 is the interface between switching unit 405 and coupled device 415. Although FIG. 4 only shows one interface, namely differential I/O interface 410, it should be understood that configurable PCI-Express switch 400 comprises one or more interfaces. In different embodiments of the present invention, differential I/O interface 410 comprises hardware coupling a device to configurable PCI-Express switch 400, a physical layer, a data link layer, a transaction layer, an application layer, and/or switch logic. Similar to differential I/O interface 210, differential I/O interface 410 may be implemented, for example, as one or more discrete components, as one or more discrete components on separate dies, or as one or more discrete components on the same die.

In the second configuration shown in FIG. 4, differential I/O interface 410 forms a differential signaling interface for communication with coupled device 415 over non-PCI-Express bus 420. As such, non-PCI-Express bus 420 can implement a number of different optimized configurations above and beyond the PCI-Express specifications. For example, data striping and 8b/10b physical layer encoding may not be required to improve data throughput and reduce latency. Also, the significant protocol and processing overhead inherent in PCI-Express may be obviated, thereby improving data transmission speed and bandwidth. As such, non-PCI-Express bus 420 need not be constrained by any PCI-Express protocols.

Moreover, configurable PCI-Express switch 400 can configure or optimize non-PCI-Express bus 420 to a given coupled device. As such, embodiments of the present invention allow a specific, customized interface to be implemented for a specific coupled device. For example, in one embodiment of the present invention, the coupled device could identify itself to configurable PCI-Express switch 400 through a handshake mechanism involving specific communication features (e.g., packet size, signal timing, sample and hold times, cyclic redundancy checks, etc.). Upon mutual identification, the switch could configure non-PCI-Express bus 420 to implement differential signaling such that the coupled device can communicate with the core logic components through configurable PCI-Express switch 400. Thus, embodiments of the present invention couple the device to other components of the computer system, such as the CPU, GPU, system memory, or the like, such that the coupled device may communicate using differential communication other than PCI-Express. Additionally, non-PCI-Express bus 420 may comprise any number of differential signaling paths depending upon the bandwidth required for the given configuration, thereby providing flexibility and expandability for future demands.

Figure 5:
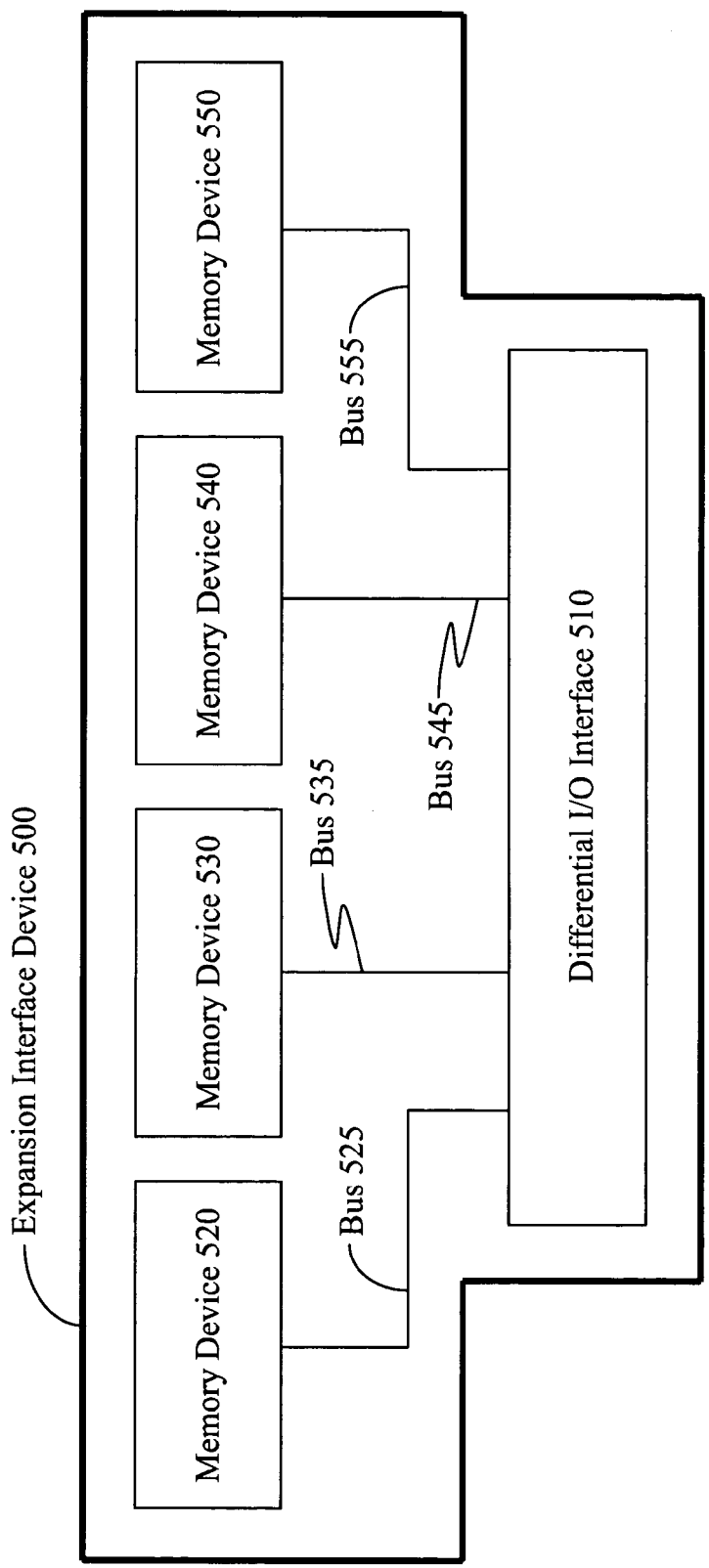
FIG. 5 shows an expansion interface device in accordance with one embodiment of the present invention.

FIG. 5 shows an expansion interface device 500 in accordance with one embodiment of the present invention. As depicted in FIG. 5, expansion interface device 500 (hereafter device 500) includes a plurality of memory devices 520, 530, 540, and 550 shown coupled to a differential I/O interface 510 via a plurality of respective buses 525, 535, 545, and 555.

In one embodiment, device 500 is adapted to couple to a configurable PCI-Express switch (e.g., configurable PCI-Express switch 200 shown in FIG. 2) implementing a PCI-Express compliant differential signaling interface with the computer system. In such an embodiment, differential I/O interface 510 is responsible for implementing the specific protocols and signaling techniques to comply with PCI-Express specifications. The function of differential I/O interface 510 is to accept I/O data from the memory devices 520-550 in whichever differential format is dictated by the specific application (e.g. differential DRAM, RDRAM, etc.), and translate such I/O data into PCI-Express compliant I/O data for communication with a coupled computer system.

Alternatively, in another embodiment, device 500 is adapted to couple to a configurable PCI-Express switch (e.g., configurable PCI-Express switch 400 shown in FIG. 4) implementing a non-PCI-Express compliant differential signaling interface with the computer system. In such an embodiment, differential I/O interface 510 remains responsible for implementing the specific protocols and signaling techniques for communicating with the configurable PCI-Express switch. However, these protocols and signaling techniques are not PCI-Express compliant in this embodiment. As described above, a customized and/or specifically optimized interface can be established between device 500 and the coupled configurable PCI-Express switch.

It should be noted that depending upon the requirements of any specific application, device 500 can function as a differential frame buffer memory for storing image data to be rendered by a GPU, or alternatively as a more general-purpose memory for storing computer readable data for use by some component or device within the computer system other than a GPU. Additionally, it should be noted that the memory devices 520-550 can be detachably coupled to device 500 (e.g., DIMMs, etc.), or can be more permanently affixed to device 500 (e.g., soldered, etc.). Also, although FIG. 5 only shows four memory devices coupled to differential I/O interface 510 via four respective buses, it should be understood that other embodiments of the present invention may include one or more memory devices and one or more buses that may or may not be coupled to more than one memory device.

Figure 6:
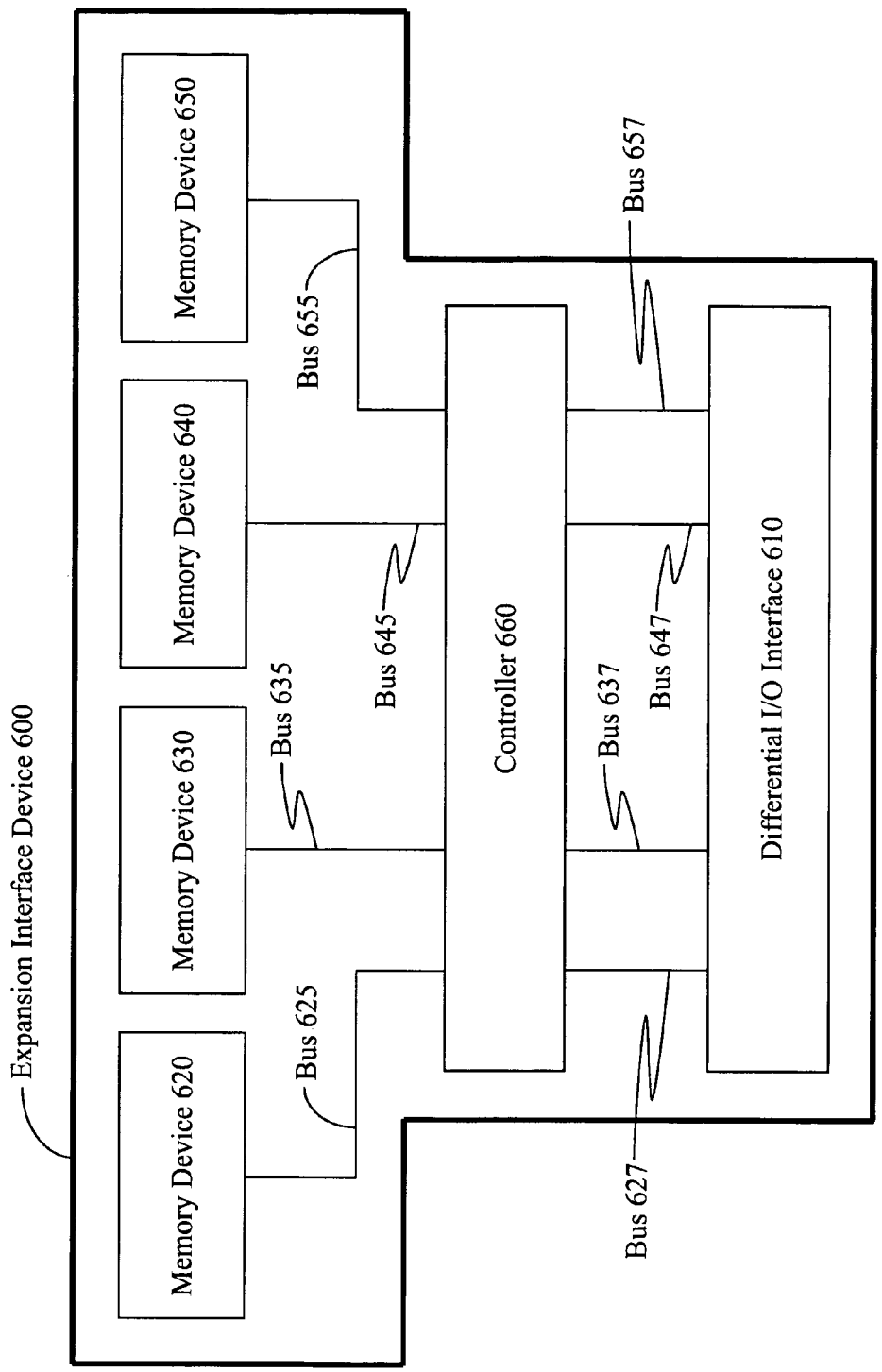
FIG. 6 shows an expansion interface device with a coupled controller in accordance with one embodiment of the present invention.

FIG. 6 shows an expansion interface device 600 in accordance with one embodiment of the present invention. As depicted in FIG. 6, expansion interface device 600 (hereafter device 600) includes a plurality of memory devices 620, 630, 640, and 650 shown coupled to differential I/O interface 610 via a plurality of respective buses 625, 635, 645, and 655, controller 660, and buses 627, 637, 647, and 657.

Device 600 of FIG. 6 is substantially similar to device 500 of FIG. 5. As such, device 600 is adaptable to couple to a configurable PCI-Express switch (e.g., configurable PCI-Express switch 200 shown in FIG. 2, or configurable PCI-Express switch 400 shown in FIG. 4) implementing either a PCI-Express compliant or a non-PCI-Express compliant differential signaling interface with the computer system. Additionally, device 600 can function as a differential frame buffer memory or as a more general-purpose memory, and memory devices 620-650 can be detachably coupled or more permanently affixed to device 600, as described above with respect to device 500 of FIG. 5.

However, unlike device 500, embodiments of device 600 include controller 660. Controller 660 provides an additional degree of flexibility in the formatting and translating of I/O data to and from memory devices 620-650.

As shown in FIG. 6, the memory devices of expansion interface device 600 are coupled to differential I/O interface 610 via controller 660. Buses 627-657 couple differential I/O interface 610 to controller 660, thereby forming differential signaling paths. Controller 660 configures the differential signals passed over buses 627-657 to communicate with memory devices 620-650. Thus, in one embodiment where the memory devices of expansion interface device 600 are single-ended (e.g., DDR DRAMs, GDDR DRAMs, etc.), controller 660 configures the differential signals passed over buses 627-657 to single-ended signals that are then passed over buses 625-655. In another embodiment where the memory devices of device 600 utilize a signaling technology other than differential or single-ended, controller 660 configures the differential signals passed over buses 627-657 to that of another signaling technology to then be passed over buses 625-655.

In the embodiment of the present invention shown in FIG. 6, memory devices 620-650 are coupled to differential I/O interface 610 via buses 625-655. However, it should be understood that in other embodiments, one or more buses may couple memory devices 620-650 to differential I/O interface 610. Additionally, although four buses are depicted in FIG. 6 as coupling differential I/O interface 610 to controller 660, it should be understood that in other embodiments, one or more buses may couple differential I/O interface 610 to controller 660, and these buses may or may not be coupled to more than one memory device. Similarly, although FIG. 6 only shows four memory devices coupled to controller 660, it should be understood that there may be one or more memory devices coupled to controller 660 in other embodiments.

In sum, embodiments of the present invention provide for digital communication with differential devices, single-ended devices, and the like, by utilizing existing PCI-Express interfaces and switches. Where the coupled devices are frame buffer memory, embodiments of the present invention allow video card manufacturers to implement dedicated frame buffer memory into an existing interface, and further, to vary the size of the frame buffer memory without producing multiple video cards. Consequently, embodiments of the present invention represent significant cost savings for computer component and system manufacturers without appreciably increasing the complexity of the components or systems.

What is claimed is:

1. A method of digital communication using a configurable switch, said method comprising:
   identifying a device coupled to a differential interface of said configurable switch, wherein said device comprises at least one memory device configured to implement single-ended signaling;
   responsive to said identifying, configuring said differential interface to operate in a configuration selected from a group consisting of a first configuration and a second configuration, wherein in said first configuration, said differential interface is operable to implement a Peripheral Component Interconnect Express (PCI-Express) interface, wherein in a second configuration, said differential interface is operable to implement a differential interface other than PCI-Express; and
   communicating data between said at least one memory device and at least one other component via a controller, wherein said controller is operable to convert between single-ended signaling and differential signaling, and wherein said at least one other component is a graphics processing unit.

2. The method of claim 1, wherein said communicating further comprises communicating between said controller and said at least one memory device using single-ended signaling, and wherein said communicating further comprises communicating between said controller and said differential interface using differential signaling.

3. The method of claim 1, wherein said device is an expansion interface device.

4. The method of claim 1, wherein said device comprises at least one other memory device configured to implement differential signaling.

5. The method of claim 1, wherein said at least one memory device is operable to communicate over said PCI-Express interface.

6. The method of claim 1, wherein said at least one memory device is operable to communicate over said differential interface other than PCI-Express.

7. A system comprising:
   a differential interface operable to be configured in a first configuration and a second configuration, wherein in said first configuration, said differential interface is operable to implement a Peripheral Component Interconnect Express (PCI-Express) interface, wherein in a second configuration, said differential interface is operable to implement a differential interface other than PCI-Express, and wherein said differential interface is coupled to at least one PCI-Express slot;
   a switching unit capable of configuring, responsive to an identification of a device coupled to said differential interface, said differential interface in a configuration selected from a group consisting of said first configuration and said second configuration, wherein said device comprises at least one memory device configured to implement single-ended signaling; and
   a controller operable to communicate data between said at least one memory device and at least one other component, wherein said controller is operable to convert between single-ended signaling and differential signaling.

8. The system of claim 7, wherein said controller is further operable to communicate with said at least one memory device using single-ended signaling, and wherein said controller is further operable to communicate with said differential interface using differential signaling.

9. The system of claim 7, wherein said device is configured to detachably couple with said PCI-Express slot.

10. The system of claim 7, wherein said device is an expansion interface device.

11. The system of claim 7, wherein said device comprises at least one other memory device configured to implement differential signaling.

12. The system of claim 7, wherein said at least one memory device is operable to communicate over said PCI-Express interface.

13. The system of claim 7, wherein said at least one memory device is operable to communicate over said differential interface other than PCI-Express.

14. The system of claim 7, wherein said controller is implemented within said device.

15. The system of claim 7, wherein said controller enables communication between said at least one memory device and a graphics processing unit via said differential interface.

16. An apparatus comprising:
 at least one memory device; and
 a controller operable to communicate data between said at least one memory device and at least one other component, wherein said at least one other component comprises a graphics processing unit, wherein said controller is further operable to communicate with said at least one memory device using single-ended signaling, and wherein said controller is further operable to communicate with said at least one other component using differential signaling, and wherein said controller is operable to convert between said single-ended signaling and said differential signaling.

17. The apparatus of claim 16, wherein said at least one other component is a differential interface operable to be configured in a first configuration and a second configuration, wherein in said first configuration, said differential interface is operable to implement a Peripheral Component Interconnect Express (PCI-Express) interface, wherein in a second configuration, said differential interface is operable to implement a differential interface other than PCI-Express.

18. The apparatus of claim 17, wherein said controller is further operable to enable said at least one memory device to communicate over said PCI-Express interface.

19. The apparatus of claim 16, wherein said controller is further operable to enable said at least one memory device to communicate over said differential interface other than PCI-Express.

20. The apparatus of claim 16, wherein said at least one memory device and said controller are implemented within a device that is configured to detachably couple with a PCI-Express slot.

21. The apparatus of claim 16 further comprising:
 at least one other memory device, and
 wherein said controller is further operable to communicate with said at least one other memory device using differential signaling.

* * * * *